United States Patent [19]

Parfomak et al.

[11] Patent Number: 4,678,594

[45] Date of Patent: Jul. 7, 1987

[54] METHOD OF ENCAPSULATING A BLEACH AND ACTIVATOR THEREFOR IN A BINDER

[75] Inventors: Eva H. Parfomak, Wallington; Winston S. Uchiyama, Somerset, both of N.J.

[73] Assignee: Colgate-Palmolive Company, New York, N.Y.

[21] Appl. No.: 756,540

[22] Filed: Jul. 19, 1985

[51] Int. Cl.[4] ........................ C11D 3/39; B29C 67/24; C01B 15/12; D06L 3/02

[52] U.S. Cl. ................................ 252/186.31; 252/91; 252/99; 252/174.13; 252/174.21; 252/186.38; 264/118

[58] Field of Search ................ 252/174.13, 91, 186.38, 252/186.3, 186.31, 99; 264/118

[56] References Cited

U.S. PATENT DOCUMENTS

| | | | |
|---|---|---|---|
| 3,637,339 | 1/1972 | Gray | 8/111 |
| 3,664,961 | 5/1972 | Norris | 252/99 |
| 3,746,621 | 7/1973 | Kondo et al. | 195/63 |
| 4,290,903 | 9/1981 | Macgilp et al. | 252/91 |
| 4,399,049 | 8/1983 | Gray et al. | 252/91 |
| 4,412,934 | 11/1983 | Chung et al. | 252/186.38 |

FOREIGN PATENT DOCUMENTS

| | | |
|---|---|---|
| 0053859 | 6/1982 | European Pat. Off. . |
| 0122763 | 10/1984 | European Pat. Off. . |
| 1204123 | 9/1970 | United Kingdom . |
| 1395006 | 5/1975 | United Kingdom . |
| 1441416 | 6/1976 | United Kingdom . |

*Primary Examiner*—Paul Lieberman
*Assistant Examiner*—Linda Skaling
*Attorney, Agent, or Firm*—Herbert S. Sylvester; Murray M. Grill; Norman Blumenkopf

[57] ABSTRACT

Granular detergent additives contain finely divided powders of both acyloxybenzene sulfonate (AOBS), e.g. nonanoyloxybenzene sulfonate, bleach activator and an oxygen containing bleach, e.g. sodium perborate, encapsulated in a water soluble organic binder, especially a nonionic ethoxylated alcohol surfactant. The bleach and bleach activator do not react with each other until the granules are added to water at which time the reaction is substantially instantaneous and complete due to the close proximity of the reactants to each other. The granular detergent additives can be used alone or as a component of a full detergent composition to provide storage stable, low temperature effective bleaching activity.

16 Claims, No Drawings

METHOD OF ENCAPSULATING A BLEACH AND ACTIVATOR THEREFOR IN A BINDER

BACKGROUND OF THE INVENTION

1. Field of the Invention

This invention relates to granular detergent additive compositions containing a bleach active compound and an activator for the bleach active compound. More particularly, this invention relates to a method for intimately mixing two powdery mutually reactive ingredients: a bleach active compound and an activator therefor, with an inert, normally solid binder, in the form of solid particles or granules, and to the resulting particulate bleach active detergent additive composition.

2. Discussion of the Prior Art

The difficulties and problems encountered when attempting to incorporate in a detergent composition detergent additive ingredients, such as fluorescers, germicides, anti-tarnishing agents, enzymes, perfumes, bleach active compounds, bleach activator compounds, etc., which additives are either reactive with each other or with other components of the composition or which are liable to decompose, discolor, separate out or aggregate, have been recognized in the art.

One proposal for solving this problem has been provided in British Patent Specification No. 1,204,123 to Unilever, Ltd. According to this proposal, the detergent additive is in the form of granules made by mechanical working of a mixture of an organic extrudable solid and the additive, with the additive being dispersed throughout the granules. The additive-containing granules may then be mixed with the remaining ingredients of the detergent composition.

According to U.S. Pat. No. 4,399,049 to Gray and Harris, the dispersibility or dissolution characteristics of the granular additives of the above-mentioned British Patent to Unilever are improved by a detergent additive composition in the form of an extrudate comprising by weight thereof:

(a) from about 75% to about 95% of particulate, infusible solids having a particle size distribution such that at least about 50% thereof passes a 250 micrometer screen and comprising storage-sensitive detergent additive material, and (b) from about 5% to about 25% of ethoxylated nonionic surfactant melting in the range from about 20° C. to about 60° C., the composition being prepared by mixing the particulate infusible solids and ethoxylated nonionic surfactant in liquid form to form a substantially homogeneous friable mass, and mechanically extruding the friable mass by means of a screw with radial discharge through an apertured screen to form extrudate in the form of elongate particles having an average lateral dimension in the range from 0.5 millimeters to 2 millimeters, and an average longitudinal dimension in the range from about 1 mm to about 6 mm.

The storage-sensitive detergent additive material can be a unifunctional or multifunctional material selected from bleaching auxiliaries, photoactivators, fluorescers, dyes, perfumes, germicides, enzymes, suds controllers, fabric conditioners and the like. Preferred detergent additive materials are organic peroxyacid bleach precursors also called bleach activators.

As described in this prior art, the above and other attempts to improve the storage-stability characteristics of detergent additive materials such as bleach activators has involved protection of the additive material from its "hostile" environment by agglomerating, coating or encapsulating the material with an organic coating material which can readily form a substantially cohesive and continuous plastic matrix in which the additive material can be embedded.

While the satisfactory improvements in storage-stability characteristics have been achieved with the above-mentioned techniques, it has been found that in the case where the detergent additive is a bleach activator, the activity or action of the detergent additive is often impaired by being embedded within the organic matrix, even where the dispersibility or dissolution characteristics of the binder are good.

Accordingly, the present invention provides detergent additive compositions having improved bleaching effectiveness, especially at low-wash water temperatures. More particularly, the invention provides detergent additive granules in which both of the oxygen-containing bleach and bleach activator are incorporated as a result of which improved stain removal (bleach activity) is achieved without impairing the storage-characteristics of the detergent additive compositions or of the full detergent compositions to which they are added. The invention also provides the improved detergent compositions which include the detergent additive compositions as well as the method for preparing the granular detergent additive compositions.

SUMMARY OF THE INVENTION

The present invention is based on the quite surprising discovery that the mutually reactive bleach compound and bleach activator which will rapidly react with each other in the presence of water to form the bleach active compound can be intimately mixed with each other prior to mixing with a molten normally solid water-soluble or dispersible binder without reacting with each other and that after extrusion and cutting the resulting individual granules provide a protective coating for the active bleach forming reactants. Still further, because of the intimate association between individual particles of bleach compound and bleach activator, upon the dissolution or dispersion of the binder in the wash water, the bleach compound and bleach activator can substantially immediately come into contact with and react with each other to provide a uniform dispersion or solution of the bleach active compound throughout the wash water thereby providing more effective contact between the fabrics to be treated and the bleach active compound and consequently more effective stain removal.

The invention also provides a full detergent composition containing the granular detergent additive composition as well as a method for preparing the granular or detergent additive composition.

According to the composition aspect of the present invention, there is first provided a granular detergent additive comprising a mixture of particles of an oxygen-containing bleach compound and particles of an activator for said bleach compound, wherein the mixed particles are dispersed in a matrix of a water-soluble binder. There is also provided a full powdery or granular detergent composition comprising an organic surfactant compound selected from anionic, nonionic, amphoteric, zwitterionic organic surfactants and mixtures thereof, at least one inorganic detergent builder salt, organic builder salt or mixture thereof, and the granular detergent additive containing therein each of the oxygen-containing bleach compound and bleach activator compound dispersed in a water-soluble binder.

According to the method aspect, the present invention provides a method for preparing a powdery or granular bleach active detergent additive composition which contains each of the oxygen-containing bleach compound and activator for the bleach compound dispersed in a solid water-soluble binder, such process including the steps of mixing finely divided bleach compound and finely divided bleach activator.

In still another aspect of the invention, there is provided a full powdery or granular detergent composition which includes at least one organic surfactant compound, at least one detergent builder salt and the bleach active granular detergent additive described above. Other detergent additives and adjuncts can also be included in the detergent composition.

DETAILED DESCRIPTION OF THE INVENTION AND PREFERRED EMBODIMENTS

The present invention provides bleach active granular detergent additives which when added to water, e.g. an aqueous wash bath, either directly or as a component of a built laundry detergent composition, will promptly release the oxygen-containing bleach compound and activator compound to form a bleach active compound, particularly a low-temperature bleach active compound, highly effective in removing/decolorizing oxidizable stains.

As used herein the "oxygen-containing bleach compound" contemplates hydrogen peroxide ($H_2O_2$) and compounds which liberate $H_2O_2$ in water. Preferred examples of compounds which liberate $H_2O_2$ in water are the percompound salts, such as the alkali metal salts of perborates, percarbonates, perpyrophosphates, persilicates and peroxides, and urea-hydrogen peroxide addition product. The alkali metal perborates are preferred, and sodium perborate monohydrate and sodium perborate is especially preferred.

The bleach activators or activators for the oxygen-containing bleach compounds, i.e. percompounds, include any of the activators for percompound bleaching agents, which are capable of lowering the temperature at which the percompound is effective, generally to a temperature lower than about 60° C., especially lower than about 40° C., for example 20° to 30° C. The bleach activator compounds are believed to react with hydrogen peroxide to form a bleach species, such as peracids, which are active at lower temperatures than hydrogen peroxide. Bleach activator compounds are well known in the art and any of the bleach activator compounds mentioned in the above-mentioned U.S. Pat. No. 4,399,049 (referred to therein as "organic peroxyacid bleach precursor") or British Pat. No. 1,204,123, as well as those mentioned in U.S. Pat. No. 4,290,903 and in British Pat. Nos. 1,395,006 and 1,441,416 can be used in the present invention. The disclosures of said prior U.S. and British patents are incorporated herein by reference.

A preferred class of activator compounds are the esters and especially highly preferred are the acyl phenol sulfonates and acylalkyl phenol sulfonates (also known a acyloxybenzene—and alkyl acyloxybenzene sulfonates, respectively). An example of acyloxybenzene sulfonate is sodium p-acetoxybenzene sulfonate (also known as sodium acetyl phenol sulfonate). Examples of acylalkyl phenol sulfonates include sodium 2-acetoxy-5-hexylbenzene sulphonate, sodium 2-acetoxy-5-dodecylbenzene sulfonate, sodium-2-acetoxycapryl benzene sulfonate, etc. A particularly useful bleach activator is sodium nonanoyloxybenzene sulfonate, of formula

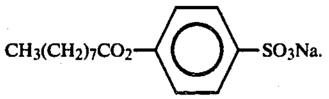

Generally, the acyloxy substituent can have from about 2 to 20 carbon atoms and may be linear or branched. There may also be one or two substituents present on the benzene ring, such as alkyl, e.g. $C_1$–$C_{15}$ alkyl. British Patent Specifications Nos. 963,135 and 1,147,871 disclose the preparation and use of acyloxybenzene sulfonates.

For the purposes of the invention, the activator material will preferably have a mean particle size less than 500 microns, preferably less than 300 microns, and most preferably less than 150 microns. For example, a particle size distribution such that at least 50%, preferably at least about 80% thereof passes a 250 micrometer screen, preferably a 150 micrometer and especially preferably a 100 micrometer screen. Particle sizes down to about 1 micron or even submicron size can be used. Such particle sizes can either be achieved by adjusting the conditions under which the activator is precipitated or crystallized in the final stages of manufacturing or by milling or otherwise reducing the size of the formed crystalline material. Suitable techniques are well known in the art. The oxygen-containing bleach compound should be in the same general particle size range as described for the bleach activator. Particle sizes for the bleach compound and activator should not be so small that dusting, caking, agglomeration or insufficient particle loading levels in the granules becomes a problem.

The ratio of bleach compound (per salt) to activator compound will depend on the chemical natures of the respective compounds, and particularly on the number of functional reactive groups on the activator which can react with hydrogen peroxide to form the desired low temperature active oxyacid bleach active compound. Generally, the amount of activator should be sufficient to provide about 0.05 to 2 moles of activator per gram atom of active oxygen of the oxygen-containing bleach compound.

The total amount of oxygen-containing bleach compound and bleach activator in the granular detergent additive is not especially critical except that the solids loading is desirably sufficiently high to yield adequate quantity of the bleach active compound when added to the wash water, whether directly as such, as in a separately prepared bleaching composition, or as a component of a fully built detergent composition. Furthermore, it is highly desirable to provide a sufficiently high solids loading level so that upon dissolution of the binder and release of the particles of bleach compound and activator compound the respective reactive particles will be in sufficiently close proximity to each other that substantially instantaneous reactions will occur. On the other hand, it is preferred and necessary that the solids loading levels not be so high that insufficient coverage of the particles by the binder results, e.g. some of the particles remain exposed at the surfaces of the granules. Generally, therefore, total solids content (powdery oxygen-containing bleach compound plus powdery activator compound, plus any other additives, e.g. coloring agents, builders, fillers, etc.) of the granular additive will preferably be within the range of from about 40% to about 97% by weight, preferably from about 50% to about 95% by weight of the granules, and especially preferably from about 75 to 95% by weight of the granules.

Furthermore, it will also be appreciated that within these broad ranges of solids loading levels the preferred loading levels may be more specifically determined based on such factors as the type of bleach forming reactants and especially on the nature and type of the detergent composition to which the granular detergent additive will be added. Specifically, it is important to provide a solids loading level which will result in a product density (referred to in the trade as cup weight or CW) which will match as closely as possible that of the powdery or granular detergent composition. By matching cup weights there is a reduced tendency for particle settling or separation to occur.

The normally solid water-soluble or water dispersible organic binder used as the matrix for coating and encapsulating the bleach forming reactants can be any of the water-soluble or water-dispersible extrudable solids disclosed in the abovementioned British Pat. No. 1,204,123 including polyglycols, polyalkylene oxides, $C_{12}$–$C_{20}$ alpha-olefin sulfonates, etc. However, the preferred organic binders are the nonionic surfactants mentioned in British Pat. No. 1,204,123 and more particularly, the ethoxylated nonionic surfactants described in greater detail in the aforementioned U.S. Pat. No. 4,399,049 which are solid at room temperature, i.e. having melting points above about 20° C., preferably above about 30° C., up to about 60° C. or more, but below the melting points of the oxygen-containing bleach compound and the bleach activator compound.

With regard to the ethoxylated nonionic surfactant component, this can be broadly defined as compounds produced by the condensation of ethylene oxide groups (hydrophilic in nature) with an organic hydrophobic compound, which may be aliphatic or alkyl aromatic in nature. The length of the polyoxyethylene group which is condensed with any particular hydrophobic group can be readily adjusted to yield a water-soluble compound having the desired degree of balance between hydrophilic and hydrophobic elements.

Examples of suitable nonionic surfactants include:

1. The polyethylene oxide condensates of alkyl phenol, e.g. the condensation products of alkyl phenols having an alkyl group containing from 6 to 12 carbon atoms in either a straight chain or branched chain configuration, with ethylene oxide, the said ethylene oxide being present in amounts equal to 3 to 30, preferably 5 to 14 moles of ethylene oxide per mole of alkyl phenol. The alkyl substituent in such compounds may be derived, for example, from polymerized propylene, diisobutylene, octene and nonene. Other examples include dodecylphenol condensed with 9 moles of ethylene oxide per mole of phenol, dinonylphenol condensed with 11 moles of ethylene oxide per mole of phenol; nonylphenol and di-isooctylphenol condensed with 13 moles of ethylene oxide.

2. The condensation product of primary or secondary aliphatic alcohols having from 8 to 30, preferably from 8 to 24 carbon atoms, in either straight chain or branched chain configuration, with from 3 to about 50 moles, preferably 5 to about 45 moles of ethylene oxide per mole of alcohol. Preferably, the aliphatic alcohol comprises between 9 and 18 carbon atoms and is ethoxylated with between 3 and 30, desirably between 5 and 14 moles of ethylene oxide per mole of aliphatic alcohol or the aliphatic alcohol has between 10 and 30 carbon atoms and is ethoxylated with between 30 and 50 moles of ethylene oxide per mole of aliphatic alcohol. The preferred surfactants are prepared from primary alcohols which are either linear (such as those derived from natural fats or, prepared by the Ziegler process from ethylene, e.g. myristyl, cetyl, stearyl alcohols), or partly branched such as the Dobanols and Neodols which have about 25% 2-methyl branching (Dobanol and Neodol being tradenames of Shell) or Synperonics, which are understood to have about 50% 2-methyl branching (Synperonic is a tradename of I.C.I.) or the primary alcohols having more than 50% branched chain structure sold under the tradename Lial by Liquichimica. Specific examples of nonionic surfactants falling within the scope of the invention include Dobanol 45-4, Dobanol 45-7, Dobanol 45-9, Dobanol 91-3, Dobanol 91-6, Dobanol 91-8, Neodol 25-7, Synperonic 6, Synperonic 14, the condensation products of coconut alcohol with an average of between 5 and 12 moles or between 35 and 45 moles of ethylene oxide per mole of alcohol, the coconut alkyl portion having from 10 to 14 carbon atoms, and the condensation products of tallow alcohol with an average of between 7 and 12 moles or between 35 and 45 moles of ethylene oxide per mole of alcohol, the tallow portion comprising essentially between 16 and 22 carbon atoms. Secondary linear alkyl ethoxylates are also suitable in the present compositions, especially those ethoxylates of the Tergitol series having from about 9 to 15 carbon atoms in the alkyl group and up to about 11, especially from about 3 to 9, ethoxy residues per molecule.

3. The compounds formed by condensing ethylene oxide with a hydrophobic base formed by the condensation of propylene oxide with propylene glycol. The molecular weight of the hydrophobic portion generally falls in the range of about 1500 to 1800. Such synthetic nonionic detergents are available on the market under the tradename of "Pluronic" supplied by Wyandotte Chemicals Corporation.

Of these, the second group of nonionic surfactants, i.e. the condensation products of primary or secondary aliphatic alcohols with ethylene oxide are preferred. It is also within the scope of the invention to use such condensation products wherein a portion of the ethylene oxide is replaced by propylene oxide in amounts which do not impair the water solubility of the binder.

The amount of the organic, normally solid, water-soluble or water-dispersible binder in the detergent additive granules should be sufficient to provide continuous coverage for the granules with the powder solids being fully embedded therein and thereby protected from exposure to the outside atmosphere. Preferably, the amount of binder is also sufficient to provide a continuous coating on each individual particle, as well as providing a continuous matrix for the dispersed coated particles. Generally, an amount of the organic binder of at least 3% by weight, preferably at least 5% by weight will be sufficient. The upper limit of the amount of binder is not particularly critical but generally care should be taken to avoid using such large amounts of binder that dissolution of the granules is delayed or to preclude adequate loading levels. Accordingly, the upper limit of the amount of binder will generally be about 60%, preferably no more than 50%, especially preferably no more than about 25% based on the total weight of the granules.

Various optional ingredients can be incorporated into the additive and detergent compositions of the present invention in order to increase efficacy, particularly in the area of detergency and stain removal. The total amount of such optional ingredients lies in the range 1%–70%, preferably 1%–30% of the additive composition when incorporated directly therein, or in the range 40%–99.0%, preferably 90%–99.5%, when incorporated in the non-additive portion of a detergent composition.

The detergent additive compositions of the invention can include a particulate dispersant, either in intimate mixture with the detergent additive material, or more as a surface-coating agent on the extrudate at a level of from about 1% to 3%, especially from about 1.1% to 2.5% by weight of the composition. Preferred dispersants include water-insoluble silica or silicate, water-soluble inorganic salt, or organic polyacid or salt thereof. Water-insoluble silicates include aluminosilicates of the clay or zeolite classes or magnesium silicate type of material. Aluminosilicates of the clay variety include sheet-like natural clays, such as the smectite-type and kaolinite-type groups. Highly suitable smectite-type clays include alkali and alkaline earth metal montmorillonites, saponites and hectorites; highly suitable kaolinite-type materials include kaolinite itself, calcined kaolin and metakaolin.

Other suitable water-insoluble silicates include aluminosilicates of the zeolite type, particularly those of the general formula $Na_z(AlO_2)_z(SiO_2)_yxH_2O$, wherein z and y are integers of at least about 6, the molar ratio of z and y is in the range from about 1.0 to about 0.5 and x is a number such that the moisture content of the aluminosilicate is from about 10% to about 28% by weight thereof. Particularly preferred materials of the zeolite class are those prepared from clay themselves, especially A-type zeolites prepared by alkali treatment of calcined kaolin.

Another suitable water-insoluble silicate is a magnesium silicate of formula $nMgO:SiO_2$ wherein n is in the range from about 0.25 to about 4.0.

Suitable water-soluble inorganic salts include magnesium sulphate or chloride, sodium bicarbonate, as well as the calcium or magnesium complexing agents useful as detergency builders. These are discussed in detail below.

Suitable organic acids include lactic acid, glycollic acid and ether derivatives thereof as disclosed in Belgium Pat. Nos. 821,368, 821,369, and 821,370; succinic acid, malonic acid, (ethylenedioxy) diacetic acid, maleic acid, diglycollic acid, tartaric acid, tartronic acid, and fumaric acid; citric acid, aconitic acid, citraconic acid, carboxymethyloxy succinic acid, lactoxysuccinic acid, and 2-oxa-1,1,3-propane tricarboxylic acid; oxydisuccinic acid, 1,1,2,2-ethane tetracarboxylic acid, 1,1,3,3-propane tetracarboxylic acid, and 1,1,2,3-propane tetracarboxylic acid; cyclopentane-cis, cis cis-tetracarboxylic acid, cyclopentadienide pentacarboxylic acid, 2,3,4,5-tetrahydrofuran-cis, cis, cis-tetracarboxylic acid, 2,5-tetrahydrofuran-cis-cis dicarboxylic acid, 1,2,3,4,5,6-hexane-hexacarboxylic acid, mellitic acid, pyromellitic acid and the phthalic acid derivatives disclosed in British Pat. No. 1,425,343; ethylene diamine tetra(methylenephosphonic acid), diethylene triamine penta(methylenephosphonic acid) and the acid salts of the above organic acids. Of the above, the preferred organic acids are citric, glycollic and lactic acids and the two phosphonic acids.

As well as being a dispersant, the above acidic materials also have a pH regulating function, of course, and are particularly valuable for the invention granular extrudates containing bleach activators.

A high preferred ingredient of the detergent compositions of the invention is a surfactant or mixture of surfactants, especially an anionic surfactant or a mixture thereof with nonionic, cationic, zwitterionic and ampholytic surfactant. The surfactant is preferably present in the non-additive portion of the detergent composition at a level of from about 1% to about 20%, more preferably from about 3% to about 16% of the total composition. A typical listing of the classes and species of these surfactants is given in U.S. Pat. No. 3,663,961 issued to Norris on May 23, 1972 and incorporated herein by reference.

The anionic surface active agents include those surface active or detergent compounds which contain an organic hydrophobic group and an anionic solubilizing group. Typical examples of anionic solubilizing groups are sulfonate, sulfate, carboxylate, phosphonate and phosphate. Examples of suitable anionic detergents which fall within the scope of the invention include the soaps, such as the water-soluble salts of higher fatty acids or resin acids, such as may be derived from fats, oils and waxes of animal or vegetable origin, e.g. the sodium soaps of tallow, grease, coconut oil, tall oil and mixtures thereof; and the sulfated and sulfonated synthetic detergents, particularly those having about 8 to 26, and preferably about 12 to 22 carbon atoms to the molecule.

As examples of suitable synthetic anionic detergents there may be cited the higher alkyl mononuclear aromatic sulfonates, such as the higher alkyl benzene sulfonates containing from 10 to 16 carbon atoms in the alkyl group in a straight or branched chain, e.g. the sodium salts of higher alkyl benzene sulfonates or of the higher alkyl toluene, xylene and phenol sulfonates; alkyl naphthalene sulfonate, ammonium diamyl naphthalene sulfonate, and sodium dinonyl naphthalene sulfonate. In one preferred type of composition, there is used a linear alkyl benzene sulfonate having a high content of 3- (or higher) phenyl isomers and a correspondingly low content (well below 50%) of 2- (or lower) phenyl isomers; in other terminology, the benzene ring is preferably attached in large part at the 3 or higher (e.g. 4, 5, 6 or 7) position of the alkyl group and the content of isomers in which the benzene ring is attached at the 2 or 1 position is correspondingly low. Particularly preferred materials are set forth in U.S. Pat. No. 3,320,174, May 16, 1976 of J. Rubinfeld.

Other anionic detergents are the olefin sulfonates, including long chain alkene sulfonates, long chain hydroxyalkane sulfonates or mixtures of alkenesulfonates and hydroxylalkanesulfonates. These olefin sulfonate detergents may be prepared, in known manner, by the reaction of $SO_3$ with long chain olefins (of 8–25, preferably 12–21, carbon atoms) of the formula $RCH{=}CHR_1$, where R is alkyl and $R_1$ is alkyl or hydrogen, to produce a mixture of sultones and alkenesulfonic acids, which mixture is then treated to convert the sultones to sulfonates. Examples of other sulfate or sulfonate detergents are paraffin sulfonates having, for example, about 10–20, preferably about 15–20, carbon atoms, such as the primary paraffin sulfonates made by reacting long chain alpha olefins and bisulfates (e.g. sodium bisulfite) or paraffin sulfonates having the sulfonate groups distributed along the paraffin chain such as the products made by reacting a long chain paraffin with sulfur dioxide and oxygen under ultraviolet light followed by neutralization with NaOH or other suitable base (as in U.S. Pat. Nos. 2,503,280; 2,507,088; 3,260,741; 3,372,188 and German Pat. No. 735,096); sulfates of higher alcohol; salts of alpha-sulfofatty esters (e.g. of about 10 to 20 carbon atoms, such as methyl alphasulfomyristate or alpha-sulfotallowate).

Examples of sulfates of higher alcohols are sodium lauryl sulfate, sodium tallow alcohol sulfate, Turkey Red Oil or other sulfonated oils, or sulfates, of mono- or di-glycerides of fatty acids (e.g. stearic monoglyceride monosulfate), alkyl poly(ethenoxy) ether sulfates such as the sulfates of the condensation products of ethylene oxide and lauryl alcohol (usually having 1 to 5 ethenoxy groups per molecule); lauryl or other high alkyl glyceryl ether sulfonates, aromatic poly(ethenoxy) ether sulfates such as the sulfates of the condensation products of ethylene oxide and nonyl phenol (usually having 1 to 6 oxyethylene groups per molecule).

The suitable anionic detergents include also the acyl sarcosinates (e.g. sodium lauroylsarcosinate) the acyl esters (e.g. oleic acid ester) of isethionates, and the acyl N-methyl taurides (e.g. potassium N-methyl lauroyl- or oleyl tauride).

Highly preferred water soluble anionic detergent compounds are the ammonium and substituted ammonium (such as mono-, di- and triethanolamine), alkali metal (such as sodium and potassium) and alkaline earth metal (such as calcium and magnesium) salts of the higher alkyl benzene sulfonates, olefin sulfonates, the higher alkyl sulfates, and the higher fatty acid monoglyceride sulfates. The particular salts will be suitably selected depending upon the particular formulation and the proportions therein.

Nonionic surface active agents include those surface active or detergent compounds which contain an organic hydrophobic group and a hydrophilic group which is a reaction product of a solubilizing group such as carboxylates, hydroxyl, amido or amino with ethylene oxide or with the polyhydration product thereof, polyethylene glycol.

As examples of nonionic surface active agents which may be used there may be noted the condensation products of alkyl phenols with ethylene oxide, e.g. the reaction product of isooctyl phenol with about 6 to 30 ethylene oxide units; condensation products of alkyl thiophenols with 10 to 15 ethylene oxide units; condensation products of higher fatty alcohols such as tridecyl alcohol with ethylene oxide; ethylene oxide addends of monoesters of hexahydric alcohols and inner ethers thereof such as sorbitan monolaurate, sorbitol monooleate and mannitan monopalmitate, and the condensation products of polypropylene glycol with ethylene oxide.

A particularly suitable composition, for use as a granular detergent material contains a mixture of a linear alkylbenzenesulfonate, as previously described, soap and nonionic detergent, with the soap and nonionic detergent being present in minor portions. The ratios of the amount of (A) soap, and (B) nonionic detergent, to (C) the total amount of the synthetic anionic sulfate and sulfonate detergent, in this mixture, are preferably as follows: A:C about 1:10 to 1:2, preferably about 1:4 to 1:6, on an anhydrous basis, B:C about 1:10 to 1:3, e.g about 1:4 to 1:6, on an anhydrous basis. The component (C) may comprise a blend of the linear alkylbenzenesulfonate detergent with other anionic synthetic sulfate or sulfonate detergents (e.g. olefin sulfonates, paraffin sulfonates having the sulfonate groups distributed along the paraffin chain, or alkyl sulfates) with the alkylbenzenesulfonate constituting, say, one-third, one-half, or two-thirds of this blend. More broadly, where the detergent components (B) and (C) are present, the total level of nonionic surfactant in the instant composition may be such as to provide a weight ratio of nonionic surfactant:anionic surfactant in the range from about 1:4 to about 4:1.

Examples of suitable amphoteric detergents are those containing both an anionic and a cationic group and a hydrophobic organic group, which is advantageously a higher aliphatic radical, e.g. of 10 to 20 carbon atoms. Among these are the N-long chain alkyl aminocarboxylic acids (e.g. of the formula

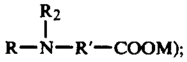

the N-long chain alkyl iminodicarboxylic acids (e.g. of the formula $RN(R'COOM)_2$) and the N-long chain alkyl bentaines (e.g. of the formula

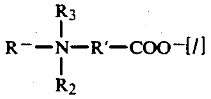

where R is a long chain alkyl group, e.g. of about 10–20 carbons, R' is a divalent radical joining the amino and carboxyl portions of an amino acid (e.g. an alkylene radical of 1–4 carbon atoms), M is hydrogen or a salt-forming metal, $R_2$ is a hydrogen or another monovalent substituent (e.g. methyl or other lower alkyl), and $R_3$ and $R_4$ are monovalent substituents joined to the nitrogen by carbon-to-nitrogen bonds (e.g. methyl or other lower alkyl substituents). Examples of specific amphoteric detergents are N-alkyl-beta-aminopropionic acid; N-alkyl-betaiminodipropionic acid, and N-alkyl, N,N-dimethyl glycine; the alkyl group may be, for example, that derived from coco fatty alcohol, lauryl alcohol, myristyl alcohol (or a laurylmyristyl mixture), hydrogenated tallow alcohols, cetyl, stearyl, or blends of such alcohols. The substituted aminopropionic and iminodipropionic acids are often supplied in the sodium or other salt forms, which may likewise be used in the practice of this invention. Examples of other amphoteric detergents are the fatty imidazolines, such as those made by reacting a long chain fatty acid (e.g. of 10 to 20 carbon atoms) with diethylene triamine and monohalocarboxylic acids having 2 to 6 carbon atoms, e.g. 1-coco-5-hydroxethyl-5-carboxymethylimidazoline; betaines containing a sulfonic group instead of the carboxylic group; betaines in which the long chain substituent is joined to the carboxylic group without an intervening nitrogen atom, e.g. inner salts of 2-trimethylamino fatty acids such as 2-trimethylaminolauric acid, and compounds of any of the previously mentioned types but in which the nitrogen atom is replaced by phosphorous.

The addition of a water-soluble cationic surfactant to the present compositions has been found to be useful for improving the greasy stain removal performance. Suitable cationic surfactants are those having a critical micelle concentration for the pure material of at least 200 ppm and preferably at least 500 ppm specified at 30° C. and in distilled water. Literature values are taken where possible, especially surface tension or conductimetric values—see Critical Micelle Concentrations of Aqueous Surfactant System, P. Mukerjee and K. J. Mysels, NSRDS-NBS 37 (1971).

A higherly preferred group of cationic surfactants of this type have the general formula:

$$R^1{}_mR^2{}_{4-m}NZ$$

wherein $R^1$ is selected from $C_{8-20}$ alkyl, alkenyl and alkaryl groups; $R^2$ is selected from $C_{1-4}$ alkyl and benzyl groups, Z is an anion in number to give electrical neutrality; and m is 1, 2 or 3; provided that when m is 2, $R^1$ has less than 15 carbon atoms and when m is 3, $R^1$ has less than 9 carbon atoms.

Where m is equal to 1, it is preferred that $R^2$ is a methyl group. Preferred compositions of this mono-long chain type include those in which $R^1$ is $C_{10}$ to $C_{16}$ alkyl group. Particularly preferred compositions of this class include $C_{12}$ alkyl trimethylammonium halide and $C_{14}$ alkyl trimethylammonium halide.

Where m is equal to 2, the $R^1$ chains should have less than 14 carbon atoms. Particularly preferred cationic materials of this class include di-$C_8$ alkyldimethylammonium halide and di-$C_{10}$ alkyldimethylammonium halide materials.

Where m is equal to 3, the $R^1$ chains should be less than 9 carbon atoms in length. An example is trioctyl methyl ammonium chloride.

Another highly preferred group of cationic compounds have the general formula:

$$R^1R^2{}_mR^3{}_{3-m}N^+A$$

wherein $R^1$ represents a $C_{6-24}$ alkyl or alkenyl group or a $C_{6-12}$ alkaryl group, each $R^2$ independently represents a $(C_nH_{2n}O)_xH$ group where n is 2, 3, or 4 and x is from 1 to 14, the sum total of $C_nH_{2n}O$ groups in $R^2{}_m$ being from 1 to 14, each $R^3$ independently represents a $C_{1-12}$ alkyl or alkenyl group, an aryl group or a $C_{1-6}$ alkaryl group, m is 1, 2 or 3, and A is an anion.

In this group of compounds, $R^1$ is selected from $C_{6-24}$ alkyl or alkenyl groups and $C_{6-12}$ alkaryl groups; $R^3$ is selected from $C_{1-12}$ alkyl or alkenyl groups and $C_{1-16}$ alkaryl groups. When m is 2, however, it is preferred that the sum total of carbon atoms in $R^1$ and $R^3{}_{3-m}$ is no more than about 20 with $R^1$ representing a $C_{8-18}$ alkyl or alkenyl group. More preferably, the sum total of carbon atoms in $R^1$ and $R^1{}_{3-m}$ is no more than about 17 with $R^1$ representing a $C_{10-16}$ alkyl or alkenyl group. When m is 1, it is again preferred that the sum total of carbon atoms in $R^1$ and $R^3{}_{3-m}$ is no more than about 17 with $R^1$ representing a $C_{10-16}$ alkyl or alkaryl group.

Additionally in this group of compounds, the total number of alkoxy radicals in polyalkoxy groups ($R^2{}_m$) directly attached to the cationic charge centre should be no more than 14. Preferably, the total number of such alkoxy groups is from 1 to 7 with each polyalkoxy group ($R^2$) independently containing from 1 to 7 alkoxy groups, more preferably, the total number of such alkoxy groups is from 1 to 5 with each polyalkoxy group ($R_2$) independently containing from 1 to 3 alkoxy groups. Especially preferred are cationic surfactants having the formula $$R^1(C_nH_{2n}OH)_m(CH_3)_{3m}N^+A$$

wherein $R^1$ is as defined immediately above, n is 2 or 3 and m is 1, 2 or 3.

Particularly preferred cationic surfactants of the class having m equal to 1 are dodecyl dimethyl hydroxyethyl ammonium salts, dodecyl dimethyl hydroxypropyl ammonium salts, myristyl dimethyl hydroxyethyl ammonium salts and dodecyl dimethyl dioxyethylenyl ammonium salts. When m is equal to 2, particularly preferred cationic surfactants are dodecyl dihydroxyethyl methyl ammonium salts, dodecyl dihydroxyethyl ethyl ammonium salts, myristyl dihydroxyethyl methyl ammonium salts, cetyl dihydroxyethyl methyl ammonium salts, stearyl dihydroxyethyl methyl ammonium salts, oleyl-dihydroxyethyl methyl ammonium salts, and dodecyl hydroxy ethyl hydroxypropyl methyl ammonium salts. When m is 3, particularly preferred cationic surfactants are dodecyl trihydroxyethyl ammonium salts, myristyl trihydroxyethyl ammonium salts, cetyl trihydroxyethyl ammonium salts, stearyl trihydroxyethyl ammonium salts, oleyl trihydroxy ethyl ammonium salts, dodecyl dihydroxyethyl hydroxypropyl ammonium salts and dodecyl trihydroxypropyl ammonium salts.

In the above, the usual inorganic salt counterions can be employed, for example, chlorides, bromides and borates. Salt counterions can also be selected from organic acid anions, however, such as the anions derived from organic sulphonic acids and from sulphuric acid esters. A preferred example of an organic acid anion is a $C_{6-12}$ alkaryl sulphonate.

Of all the above cationic suurfactants, especially preferred are dodecyl dimethyl hydroxyethyl ammonium salts and dodecyl dihydroxyethyl methyl ammonium salts.

Additional preferred cationic surfactants are fully disclosed in British patent application No. 79-25946 and incorporated herein by reference.

The above water-soluble cationic surfactants can be employed in nonionic/cationic surfactant mixtures in a weight ratio of from about 10:6 to about 20:1, more preferably from about 10:2 to about 10:6, and particularly from about 10:3 to 10:5.

The detergent compositions of the invention can also contain from about 5% to about 93% of detergency builder, preferably from about 20% to about 70% thereof.

Suitable detergent builder salts useful herein can be of the polyvalent inorganic and polyvalent organic types, or mixtures thereof. Non-limiting examples of suitable water-soluble, inorganic alkaline detergent builder salts include the alkali metal carbonates, borates, phosphates, polyphosphates, tripolyphosphates and bicarbonates.

Examples of suitable organic alkaline detergency builder salts are:

(1) water-soluble amino polyacetates, e.g. sodium and potassium ethylenediaminetetraacetates, nitrilotriacetates, and N-(2-hydroxyethyl)nitrilodiacetates;

(2) water-soluble salts of phytic acid, e.g. sodium and potassium phytates;

(3) water-soluble polyphosphonates, including, sodium, potassium, and lithium salts of ethane-1-hydroxy-1,1-diphosphonic acid; sodium, potassium and lithium salts of methylenediphosphonic acid and the like;

(4) water-soluble polycarboxylates such as the salts of lactic acid, glycollic acid and ether derivatives thereof as disclosed in Belgian Pat. Nos. 821,368, 821,369 and 821,370; succinic acid, malonic acid, (ethylenedioxy)-diacetic acid, maleic acid, diglycollic acid, tartaric acid, tartronic acid and the fumaric acid; citric acid, aconitic acid, citraconic acid, carboxymethyloxysuccinic acid, lactoxysuccinic acid, and 2-oxy-1,1,3-propane tricarboxylic acid; oxydisuccinic acid, 1,1,2,2-ethane tetracarboxylic acid, 1,1,3,3-propane tetracarboxylic acid and 1,1,2,3-propane tetracarboxylic acid; cyclopentane-cis, cis, cis-tetracarboxylic acid, cyclopentadienide pentacarboxylic acid, 2,3,4,5-tetrahydrofuran-cis, cis, cis-tetracarboxylic acid, 2,5-tetrahydrofuran-cis-dicarboxylic acid, 1,2,3,4,5,6-hexane-hexacarboxylic acid, mellitic acid, pyromellitic acid and the phthalic acid derivatives disclosed in British Pat. No. 1,425,343.

Mixtures of organic and/or inorganic builders can be used herein. One such mixture of builders is disclosed in Canadian Pat. No. 755,038, e.g. a ternary mixture of sodium tripolyphosphate, trisodium nitrilotriacetate, and trisodium ethane-1-hydroxy-1,1-diphosphate.

A further class of builder salts is the insoluble aluminosilicate type which functions by cation exchange to remove polyvalent mineral hardness and heavy metal ions from solution. A preferred builder of this type has the formulation $Na_z(AlO_2)_z(SiO_2)_yxH_2O$ wherein z and y are integers of at least 6, the molar ratio of z to y is in the range from 1.0 to about 0.5 and x is an integer from about 15 to about 264. Compositions incorporating builder salts of this type form the subject of British Patent Specification No. 1,429,143 published Mar. 24, 1976, German Patent Application OLS No. 2,433,485 published Feb. 6, 1975 and OLS No. 2,525,778 published Jan. 2, 1976, the disclosures of which are incorporated herein by reference.

The detergent compositions of the invention can also be supplemented by from about 0.05% to about 0.6% (acid basis), preferably from about 0.06% to about 0.3% of aminopolyphosphonic acid, or salt thereof, having the general formula:

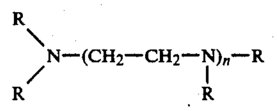

wherein n is an integral number from 0 to 3, and each R is individually hydrogen or $CH_2PO_3H_2$ provided that at least half of the radicals represented by R are $CH_2PO_3H_2$. Preferred aminopolyphosphonic acids are selected from nitrilotri(methylenephosphonic acid), ethylene-diaminetetra(methylenephosphonic acid), diethylenetriamine(pentamethylenephosphonic acid), and mixtures thereof.

An alkali metal, or alkaline earth metal, silicate can also be present, preferably from about 3% to about 8%. Suitable silicate solids have a molar ratio of $SiO_2$/alkali $metal_2O$ in the range from about 1.0 to about 3.3, more preferably from 1.5 to 2.0.

Various other materials may be present in the granular washing products. Thus, materials, such as the higher fatty acid amides may be added to improve detergency and modify the foaming properties in a desirable manner. Examples thereof are the higher fatty acid alkanolamide, preferably having 2–3 carbons in each alkanol group and a fatty acyl radical within the range of 10–18 carbons, preferably 10–14 carbons, such as lauric or myristic monoethanolamides, diethanolamides and isopropanolamides. Tertiary higher alkyl amino oxides such as having about 10–18 carbons in one alkyl group, e.g. lauryl or myristyl dimethylamine oxides, may be added also. Fatty aclohols of 10–18 carbons, such as lauryl or coconut fatty alcohols, or cetyl alcohol are suitable additives also. A hydrotropic material such as the lower alkyl aryl sulfonates, e.g. sodium toluene or xylene sulfonates, can assist processing also. In general, these materials are added in minor amounts, usually from about ½ to 10%, preferably 1 to 6%, based on the total solids.

The washing products may also contain optical brightening agents or fluorescent dyes (e.g. in amount in the range of about 1/20% to ½%); germidical ingredients such as halogenated carbanilides, e.g. trichlorocarbanilide, halogenated salicylanilide, e.g. tribromosalicylanilide, halogenated bisphenols, e.g. hexachlorophene, halogenated trifluoromethyldiphenyl urea, zinc salt of 1-hydroxy-2-pyridinethione and the like (e.g. in amounts in the range of about 1/50% to 2%); soil-suspending agents such as sodium carboxymethyl cellulose or polyvinyl alcohol, preferably both, or other soluble polymeric materials such as methyl cellulose (the amount of suspending agent being, for example, in the range of about 1/20% to 2%); antioxidants such as 2,6-di-tert-butylphenol, or other phenolic antioxidant materials (e.g. in amounts in the range of about 0.001 to 0.1%), coloring agents, enzymes, and other additives.

Preferred enzymatic materials include the commercially available amylases and neutral and alkaline proteases conventionally incorporated into detergent compositions. Suitable enzymes are discussed in U.S. Pat. Nos. 3,519,570 and 3,533,139. Examples of suitable enzymes include the materials sold under the Registered Trademarks Maxatase and Alcalase.

Anionic fluorescent brightening agents are well known materials, examples of which are disodium 4,4′-bis-(2-diethanol-amino-4-anilino-s-triazin-6-ylamino)-stilbene-2:2′disulphonate, disodium 4,4′-bis-(2-morpholino-4-anilino-s-triazin-6-ylaminostilbene-2:2′-disulphonate, disodium 4,4′-bis-(2,4-dianilino-s-triazin-6-ylamino)stilbene-2:2′-disulphonate, disodium 4,4′-bis-(2-anilino-4-(N-methyl-N-2-hydroxyethylamino)-s-triazin-6-ylamino)stilbene-2,2′-disulphonate, disodium 4,4′-bis-(4-phenyl-2,1,3-triazol-2-yl)-stilbene-2,2′-disulphonate, disodium 4,4′-bis(2-anilino-4-(1-methyl-2-hydroxyethylamino)-s-triazin-6-ylamino)stilbene-2,2′disulphonate and sodium 2(stilbyl-4″-(naphtho-1′,2′:4,5)-1,2,3-triazole-2″-sulphonate.

Other fluorescers which can be included in the non-additive portion of the detergent composition are the 1,3-diaryl pyrazolines and 7-alkylaminocoumarins.

In general terms, the granular bleach active detergent additive compositions according to the invention are made by (1) mixing together the powdery finely-divided oxygen containing bleach compound and the powdery finely-divided bleach activator compound and any other optional powdery additives to obtain a homogeneous powder mixture;

(2) mixing the liquid of molten organic binder with the powder mixture of step (1) to coat all or substantially all of the particles of the powder mixture with the binder and obtain a homogeneous extrudable mass;

(3) extruding the mass; and (4) cooling and shaping the extruded mass to obtain the product granular detergent additive.

The granules of this invention may be of various shapes. In one suitable form they are short, generally cylindrical rods, noodles or strands whose diameters are in the range of about 0.3 to 2.0 mm (preferably about 0.4 to 1.4 mm) and whose lengths are in the range of about 1.0 to 20.0 mm (preferably about 2.0 to 10.0 mm). In another suitable form the granules are of spherical form having diameters in the range of about 0.1 to 2.0 mm (preferably about 0.5 to 1.0 mm). Among other shapes mention may be made of cubes, rectangular prisms and parallelepipeds obtainable by suitable selection of the extrusion die. Generally speaking, the average particle volume of the granules is preferably within the range of about 0.005 to 20 $mm^3$, but may vary within the limits of 0.005 to 20 $mm^3$. Prferably, the particles have an average longitudinal:average lateral dimension ratio of from about 1.1:1 to about 3:1, more preferably from 1.3:1 to about 1.8:1. In this context, "average" refers to a simple number average.

In one embodiment of the invention, the mixed powdered ingredients may (after grinding to eliminate large particles) be mixed with the liquid organic binder to form a substantially uniform paste which can then be milled to improve its homogeneity, after which the milled product (e.g. in ribbon or flake form) can be passed through a plodder and extruded therefrom as a bundle of thin parallel threads; the threads may then be surface-hardened, as by cooling, dried to remove some of their moisture, and then broken up in a granulating apparatus or otherwise cut into desired lengths. In another method, the liquid binder containing workable mass is extruded (e.g. by using a single or twin screw extruder) to form thin short rods which are then rounded by rapidly rolling them while they are in plastic condition, into generally spherical shape. These procedures generally give granules that are compact and whose individual granule density is about 1 gram per cubic centimeter, e.g. in the range of about 1.2 to 1.6 grams per cubic centimeter.

In order to prevent premature reaction between the oxygen-containing bleach compound, e.g. alkali metal perborate, and bleach activator, e.g. acyloxybenzene sulfonate, steps (1) and (2) and preferably also steps (3) and (4) should be carried out in the substantial absence of moisture, i.e. under anhydrous conditions, including atmospheric humidity. Once the active bleach forming reactants are coated with the organic binder it is not as essential to avoid contact with moisture but still the presence of moisture even during the extruding and cooling/shaping steps should be minimized or avoided all together so as to prevent dissolution of the water-soluble organic binder, gelling of the binder, etc.

For the same reason, it is important to maintain the temperatures during the mixing and extruding steps at appropriate levels to minimize the possibility of reaction between the bleach forming reactants. Generally speaking for most of the useful activators it will be sufficient to maintain temperatures below about 80° C., preferably below about 70° C., especially preferably below about 65° C.

Naturally, during step (2) the temperature will be such as to maintain the binder in a sufficiently liquid state so as to be able to flow over and around the solid powdery particles to provide the desired coating. During step (3) the temperature can be lowered, if necessary, to make the binder more plastic or wax-life in nature to increase the cohesiveness of the extrudable mass.

It has been found that particularly good results have been achieved when the powdery mixture and molten or liquid binder are mixed (step (2)) in a sigma blade mixer although any other type of mixing apparatus capable of providing a homogeneous extrudable mass can also be used.

Also, good results have been achieved using a single screw extruder with one or more, for example 1, 2 or 3 heating zones and one or more, for example 1, 2 or 3 cooling zones. In one preferred embodiment the homogeneous extrudable mass is extruded with a soap plodder, such as a 1½ inch-single screw Stephen Beck Soap Plodder with a specially machined 1 mm pore extrusion plate with the jacket of the extruder cooled to maintain the temperature of the extrudate at less than about 65° C. Conveniently the powder mixture and the molten or liquid binder can be fed to a preplodder or compactor or mixer associated with or directly connected to the inlet feed port of the extruder.

The full detergent compositions to which the granular detergent additives of the invention are conveniently added are most often in the form of spray-dried hollow beads or spongeous low density granules, the particle sizes of which are usually such that a major portion is at least about 0.2 mm in diameter, e.g. about 0.3 or 0.4, or even 0.5 or 1 to 2 mm.

Generally, the granular detergent additive may comprise from about 0.1 to about 49%, preferably from about 0.2 to 20% of the weight of the full detergent composition.

Preferred granular detergent compositions comprise:

(a) from about 40% to about 99.9% of spray-dried powder comprising
  (i) from about 1% to about 20% of organic surfactant selected from anionic, zwitterionic and ampholytic surfactants and mixtures thereof,
  (ii) from about 5% to about 93.9% of detergency buider, and
  (iii) from about 5% to about 18% moisture,
(b) from about 0.1% to about 20% of the detergent additive composition, and optionally
(c) up to about 25% of ethoxylated nonionic surfactant in intimate mixture with the spray-dried base powder and detergent additive composition.

The density, particle size, shape, color and composition of the granular detergent bleach-reactants containing additive should be matched to the corresponding values of the detergent spray-dried powder so as to avoid separation or aggregation of the respective particles, to enhance consumer appeal, and to maximize the compatibility between the bleach reactants and bleach active species on the one hand and the detergent and additives (e.g. builders, enzymes, etc.) on the other.

Of course, it will be appreciated that the granular detergent additives of this invention are useful, per se, as a bleach active composition alone or for admixture with conventional detergents at the point of use. Since the bleach reactant containing granules combine chemical stability, high solubility and good granular flow characteristics, they are eminently suitable for use alone or as a component of a full detergent composition to provide highly effective bleaching even at low wash water temperatures.

The following examples illustrates the present invention further without implying any limitations thereof. All parts and percentages are by weight unless otherwise noted.

EXAMPLE 1

In these examples, the nonionics, Neodol 25-7 (an aliphatic alcohol having from 12 to 15 carbon atoms condensed with 7 moles of ethylene oxide per mole of alcohol) or TA-40 (a coco fatty acid alcohol condensed with about 40 moles ethylene oxide in the amounts shown in Table 1 are melted at about 55° C. and the melted nonionic is added to a powdery mixture of nonanoyloxybenzene sulfonate (NOBS) and sodium perborate (mono- or tetra-hydrate), also in the amounts shown in Table 1 while mixing in a sigma blade mixer heated to about 58° C. The resulting homogeneous mixture is fed to a 1½ inch Stephen Beck Soap plodder having a single worm screw fitted at the extrusion outlet with a 1 millimeter pore size extrusion plate. The temperature at the outlet of the extruder is maintained at about 60° to 64° C. or lower by circulating water through the jacket surrounding the extrusion section. The resulting extruded 1 mm strands (spaghetti) are cut to 5 to 10 mm lengths. The resulting granules are characterized by their surface condition: tacky, less tacky, friable or strong; and by their color: white or off-color. The results are also shown in Table 1.

TABLE 1

| | Run No. | | | | |
|---|---|---|---|---|---|
| | 1 | 2 | 3 | 4 | 5 |
| Ingredient | | | (weight %) | | |
| NOBS | 55 | 50 | 42 | 58 | 67 |
| Sodium Perborate | | | | | |
| Monohydrate | 27 | 25 | | 29 | 24 |
| Tetrahydrate | | | 42 | | |
| Nonionic | | | | | |
| Neodol 25-7 | 18 | 17 | | | |
| TA-40 | | | 16 | 13 | 9 |
| Bentonite | | 9 | | | 0 |
| Surface Condition | Tacky | Less Tacky | Friable | Strong | Strong* |
| Color | White | Off-Color | White | White | White |

*The granules were considered highly powdery.

EXAMPLE 2

The granular detergent additive of Run No. 4 of Example 1 was added to the commercially available spray-dried bead type built detergent composition sold by Colgate-Palmolive Co. under the trademark Fresh Start to provide 6 parts of granules per 40 parts of Fresh Start beads. The Fresh Start detergent beads have a cup weight of 157 while the detergent granules of Run No. 4 have a cup weight of 145.

Three different batches of the mixture of additive and Fresh Start are stored for two weeks at temperatures of 110° F., 100° F. or room temperature (70° F.) at a relative humidity of 0%. No decomposition (as measured by loss of oxygen) is observed.

When the detergent composition (Fresh Start plus granular detergent additive) is added to water at 40° C., the granules dissolve within about 60 seconds and substantially all of the perborate and AOBS are consumed to form the corresponding low temperature active oxyacid bleach.

What is claimed is:

1. A method for preparing a granular detergent additive which contains each of a bleach compound and an activator for said bleach compound encapsulated in a binder, said method comprising mixing finely divided bleach compound and finely divided activator for said bleach compound, mixing the mixture of bleach compound and activator compound with a molten, normally solid water-soluble binder, extruding the resulting mixture, and cutting the extrudate into granules, whereby said bleach compound and activator compound in said granules will not react with each other until the granules are added to water at a temperature which will dissolve said binder.

2. The method of claim 1 wherein the mixing steps are carried out under substantially anhydrous conditions.

3. The method of claim 2 wherein the mixing steps are further carried out at a temperature at which the bleach compound and activator compound are substantially non-reactive with each other.

4. The method of claim 2 wherein the binder is a nonionic surface active compound.

5. The method of claim 4 wherein the bleach compound is sodium perborate monohydrate and the bleach activator compound is nonanoyloxy benzene sulfonate.

6. A method for preparing a freely-flowing non-tacky granular detergent additive comprising a perborate salt bleaching compound and an acyloxy benzene sulfonate compound as an activator for said perborate salt bleaching compound, said method comprising the steps of (A) combining from about 75 to about 95 parts by weight of a mixture of powdery perborate salt bleaching compound and powdery acyloxybenzene sulfonate compound activator with from about 25 to 5 parts by weight of a normally solid, molten nonionic surfactant, as a coating and binder for said powdery mixture;

(B) extruding the mixture from step (A) while maintaining the temperature of the extrudate below the reaction temperature at which the perborate salt and activator compound in said extrudate are reactive with each other; and (C) cooling the extrudate to solidify the binder and cutting the extrudate into granules.

7. The method of claim 6 wherein step (A) is carried out under substantially anhydrous conditions.

8. The method of claim 6 wherein in step (B), the temperature is maintained between the softening temperature of the binder and the solidification temperature of the binder whereby the binder assumes a wax-like consistency.

9. The method of claim 6 wherein the perborate salt bleaching compound is sodium perborate monohydrate and the acyloxy benzene sulfonate compound activator is sodium nonanoyloxy benzene sulfonate.

10. A method for preparing a granular detergent additive which contains each of a bleach compound and an activator for said bleach compound, the total amount of the bleach and bleach activator in the additive being from about 40 to about 97% by weight of the additive, said method comprising mixing finely divided bleach compound and finely divided activator for said bleach compound at a mole ratio to provide from about 0.05 to 2 moles of activator per gram atom of active oxygen of the oxygen-containing bleach compound, mixing the mixture of bleach compound and activator compound with a molten, normally solid, nonionic surfactant, as a binder, extruding the resulting mixture, and cutting the extrudate into granules, whereby said bleach compound and activator compound in said granules will not react with each other until the granules are added to water at a temperature which will dissolve said binder.

11. The method of claim 10 wherein the mixing steps are carried out under substantially anhydrous conditions and at a temperature at which the bleach compound and activator compound are substantially non-reactive with each other.

12. The method of claim 10 wherein the bleach compound is sodium perborate monohydrate and the bleach activator compound is nonanoyloxy benzene sulfonate.

13. A method for preparing a free-flowing non-tacky granular detergent additive comprising a perborate salt bleaching compound and an acyloxy benzene sulfonate compound as an activator for said perborate salt bleaching compound, said method comprising the steps of (A) combining from about 50 to about 95 parts by weight of a mixture of powdery perborate salt bleaching compound and powdery acyloxy benzene sulfonate compound activator at a mole ratio to provide from about 0.05 to 2 moles of activator per gram atom of active oxygen of the oxygen-containing bleach compound, with from about 50 to 5 parts by weight of a normally solid, molten nonionic surfactant, as a coating and binder for said powdery mixtures;

(B) extruding the mixture from step (A) while maintaining the temperature of the extrudate below the reaction temperature at which the perborate salt and activator compound in said extrudate are reactive with each other; and (C) cooling the extrudate to solidify the binder and cutting the extrudate into granules.

14. The method of claim 13 wherein step (A) is carried out under substantially anhydrous conditions.

15. The method of claim 14 wherein in step (B) the temperature is maintained between the softening temperature of the binder and the solidification temperature of the binder whereby the binder assumes a wax-like consistency.

16. The method of claim 13 wherein the perborate salt bleaching compound is sodium perborate monohydrate and the acyloxy benzene sulfonate compound activator is sodium nonanoyloxy benzene sulfonate.

* * * * *